United States Patent [19]

Peddle

[11] Patent Number: 4,522,380
[45] Date of Patent: Jun. 11, 1985

[54] ADJUSTABLE JIG ASSEMBLY

[75] Inventor: Darren C. Peddle, Lower Sackville, Canada

[73] Assignee: Her Majesty the Queen in right of Canada, as represented by the Minister of National Defence, Canada

[21] Appl. No.: 529,639

[22] Filed: Sep. 6, 1983

[30] Foreign Application Priority Data

Oct. 27, 1982 [CA] Canada .................................. 414249

[51] Int. Cl.³ .............................................. B23Q 1/04
[52] U.S. Cl. ....................................... 269/71; 269/74; 269/76
[58] Field of Search ....................... 269/55, 57, 63, 64, 269/65, 66, 67, 68, 69, 71, 72, 74, 76, 82–85, 61; 108/10

[56] References Cited

U.S. PATENT DOCUMENTS

| | | | |
|---|---|---|---|
| 434,237 | 8/1890 | Becker | 269/67 |
| 1,834,294 | 12/1931 | Spahn | 269/71 X |
| 2,729,883 | 1/1956 | Hilkemeier | 269/61 |
| 2,846,761 | 8/1958 | Evans | 269/84 |
| 3,184,207 | 5/1965 | Hermanns et al. | 108/10 X |

Primary Examiner—Frederick R. Schmidt
Assistant Examiner—Steven P. Schad
Attorney, Agent, or Firm—Kerkam, Stowell, Kondracki & Clarke

[57] ABSTRACT

An adjustable jig assembly for holding a work piece in a desired position, comprising a stand having wall members defining a pair of opposed substantially vertically extending slide channels, mounting means slidable in the slide channels for fixedly mounting therebetween an axially rotatable retaining means in desired vertical and axial orientation, and a work piece engaging member adapted to be fixedly retained by the retaining means in desired orientation about an axis normal to that of the axially rotatable retaining means. The adjustable jig assembly is particularly useful in manufacturing replacement flanged pipes due to the criticality of reproducing the exact spatial orientation of the flange members. Present practice requires that individual jigs be custom made for each flange and that the individual jigs be identifiably coded so that they can be reused during a stress relieving treatment subsequent to welding and machining operations. Disadvantages of the present practice include unnecessary wastage of time and material to custom make the individual jigs, the necessity of identifiably coding the individual jigs and the potential necessity of transporting the individual jigs to different work sites since welding and stress relieving are frequently carried out in separate locations.

11 Claims, 6 Drawing Figures

ADJUSTABLE JIG ASSEMBLY

FIELD OF THE INVENTION

The present invention relates to an adjustable jig assembly for holding a work piece in a desired position. More specifically, the present invention relates to an adjustable jig assembly particularly useful in manufacturing replacement flanged pipes, for boiler systems and the like, due to the criticality of reproducing the exact spatial orientation of the flange members at the opposite ends of the pipe so that the replacement flanged pipe is a duplicate of the original flanged pipe and can be bolted into the boiler system or the like in replacement of the original.

BACKGROUND OF THE INVENTION

In manufacturing replacement flanged pipes the present practice, which will be discussed in detail later, requires that individual jigs be custom made for each flange and that the individual jigs be identifiably coded relative to the respective flanges so that they can be reused during a stress relieving treatment subsequent to welding and machining operations.

Disadvantages of the present practice include unnecessary wastage of time and material to custom make and identifiably code the individual jigs and the potential necessity of transporting the identifiably coded individual jigs to different work sites since welding and stress relieving are frequently carried out in separate locations.

The present invention provides an adjustable jig assembly adapted to hold a work piece in a desired position, dispensing with the necessity, in the case of the manufacture of a replacement flanged pipe, of having to custom make individual jigs, since a pair of the adjustable jig assemblies can be employed to hold the respective flanges at the opposite ends of the pipe in the necessary respective spatial orientations during work operations.

SUMMARY OF THE INVENTION

In a broad aspect the present invention provides an adjustable jig assembly for holding a work piece in a desired position, comprising a stand, mounting means mounted on the stand for movement along a first axis, axially rotatable retaining means mounted on the mounting means, a work piece engaging member mounted on the retaining means for rotation about an axis normal to that of the axially rotatable retaining means, and releasable means for fixing the assembly in the desired position.

In a more specific aspect the present invention provides an adjustable jig assembly for holding a work piece in a desired position, comprising a stand having wall members defining a pair of opposed substantially vertically extending slide channels, mounting means slidable in the slide channels for fixedly mounting therebetween an rotatable retaining means in desired vertical and angular orientation, and a work piece engaging member adapted to be fixedly retained by the retaining means in desired orientation about an axis normal to that of the rotatable retaining means.

DETAILED DESCRIPTION

Figure 1:
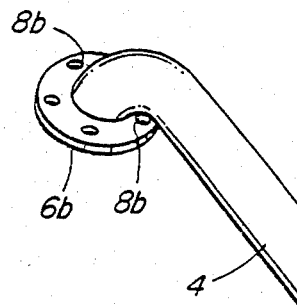
FIG. 1 is a perspective view of an exemplary flanged pipe.

Referring now to FIG. 1, a flanged pipe 2, which will subsequently be referred to as the original flanged pipe, is comprised of a length of pipe 4 of complex curvature extending between flanges 6a and 6b, each having a plurality of bolt holes 8a and 8b defining respective bolt hole patterns.

The presently practiced procedure of manufacturing a replacement flanged pipe identical to the original flanged pipe illustrated in FIG. 1 will now be described with reference to FIG. 2 which illustrates an exemplary intermediate step in the presently practiced procedure, from which the whole of the presently practiced procedure can be described.

Initially, the flanges 6a and 6b of the intact original flanged pipe 2 are respectively clamped to blanks from which the individual jig plates 10a and 10b will be made. The jig plate blanks typically are approximately one foot square pieces of solid mild steel plate. The plurality of bolt holes 8a and 8b of the flanges 6a and 6b are marked on the jig plate blanks, the jig plate blanks are then unclamped from the flanges 6a and 6b and drilled as appropriate to provide the plurality of bolt holes 12a and 12b which reproduce the respective bolt hole patterns of the flanges 6a and 6b in the jig plate blanks. Portions of the jig plate blanks which are centered coaxially within the bolt hole patterns are then burnt out or drilled out to provide holes 14a and 14b of a size through which a piece of new pipe of the same diameter as pipe 4 will pass. The resultant jig plates 10a and 10b are then bolted to the flanges 6a and 6b of the original flanged pipe 2 through the respective bolt holes 8a and 8b and 12a and 12b. The jig plates 10a and 10b, with the original flanged pipe thus installed, are then fixed in relation to a working surface, for example a metal clad floor or table, by means of appropriate angle braces or legs 16a and 16b which can be tack welded to the jig plates 10a and 10b and the working surface to complete the individual jigs. The original flanged pipe 2 is then unbolted from the jig plates 10a and 10b and new flanges, themselves stock items, of the same diameter and bolt hole patterns as the flanges 6a and 6b of the original flanged pipe 2 are bolted to the respective jig plates 10a and 10b. A length of new pipe 18, of the same diameter as the pipe 4 of the original flanged pipe 2 is then bent as appropriate to fit through the new flanges and through the holes 14a and 14b of the jig plates 10a and 10b. The new pipe 18 is aligned relative to the new flanges to match the configuration of the original flanged pipe 2 and the new flanges are tack welded to the new pipe 18. The jig plates 10a and 10b and respective new flanges are identifiably coded, the new flanges unbolted, the tack welds fixing the jig plate angle braces or legs 16a and 16b to the working surface burnt out, and the partially completed replacement flanged pipe is removed. The new flanges are then fully welded to the new pipe 18, and the ends of the new pipe 18 are machined flush with the respective flange faces. Although the replacement flanged pipe now appears to be completed, it is still necessary to stress relieve the replacement flanged pipe, by heat treatment, to relieve stresses resultant from pipe bending and welding. The replacement flanged pipe is accordingly rejigged, in order to maintain its exact shape during the stress relieving heat treatment, by bolting the respective new flanges to the custom made jig plates 10a and 10b, having previously been identifiably coded for such purpose, and by again tack welding the angle braces or legs 16a and 16b to a working surface. The replacement flanged pipe is then heated to the desired temperature and thereafter slowly cooled. The replacement flanged pipe is then unbolted from the jig plates 10a and 10b and is ready for installation in place of the original flanged pipe.

The jig plates 10a and 10b and the material for the angle braces or legs 16a and 16b may or may not be suitable for further use, and typically are scrapped in short order.

The adjustable jig assembly of the present invention, typically used in pairs in the manufacture of a replacement flanged pipe, can be adjusted to accomodate most flanged pipes, particularly most pipes having up to about an 8″ flange, and can be reused substantially indefinitely. Furthermore, due to the ready adjustability, it is not necessary to use the same adjustable jig assembly units for both the replacement flanged pipe fabrication and stress relieving operations, thereby rendering it unnecessary to identifiably code the adjustable jig assembly units relative to a particular flange of a particular pipe, or to transport the adjustable jig assembly units between different work sites since each location can be provided with its own units.

The present invention will now be described in greater detail with reference to FIGS. 3 to 6, which illustrate preferred embodiments of an adjustable jig assembly and its components.

The adjustable jig assembly includes a stand 20 having a base plate 22 and side wall members 24a and 24b and 26a and 26b which define a pair of opposed substantially vertically extending slide channels 28a and 28b. The stand can additionally be provided, as desired or necessary, with reinforcing features such as the exemplary slide channel braces 30a and 30b, gussets 32a, 32b, 32c and 32d and back cross brace 34. The stand 20 is further provided with replaceable tack pads 36a and 36b which project from beneath the base plate 22 and are secured thereto by means for example of bolts (not shown) threaded into the tack pads 36a and 36b through bolt holes 38a, 38b, 38c and 38d. Corresponding replaceable tack pads (not shown) are also typically installed in association with the rear edge of the base plate 22.

Slide blocks 40a and 40b are provided for sliding movement in channels 28a and 28b to a desired position. The slide blocks and associated components will now be described in greater detail with specific reference to slide block 40a, it being understood that an essentially complementary assembly is provided in association with slide block 40b. Slide block 40a is journalled to receive a terminally threaded stub axle 42 which fixedly extends from a work piece engaging member retaining means 44 which is rotatable relative to the slide block 40a by virtue of rotation of the stub axle. A plate member 46, bored to fit over the stub axle 42 and adapted to overlie the rear edges of side wall members 24a and 26a, is fitted over the stub axle 42 and nut 48 tightened to secure the retaining means 44 in desired vertical. In the embodiment illustrated, slide block 40a is provided with rear surface portions 50 and 52 which protrude rearwardly through slide channel 28a and cooperate to seat the plate 46.

The retaining means includes a housing having a collar section 54 in which is mounted an rotatable work piece engaging member 56 which is adapted to be fixed in a desired angular position by means, for example, of set bolts 58a and 58b, of which any desired number may be provided. The set bolts 58a and 58b are threaded through the collar section 54 and engage the circumference of the work piece engaging member 56. The work piece engaging member 56 can of course be interchanged at will dependent upon the nature of the work piece to be engaged. In the case of the manufacture of replacement flanged pipe, the appropriate work piece engaging member 56 can be selected from a stock of assorted flange discs having various bolt hole patterns and central openings.

Figure 3:
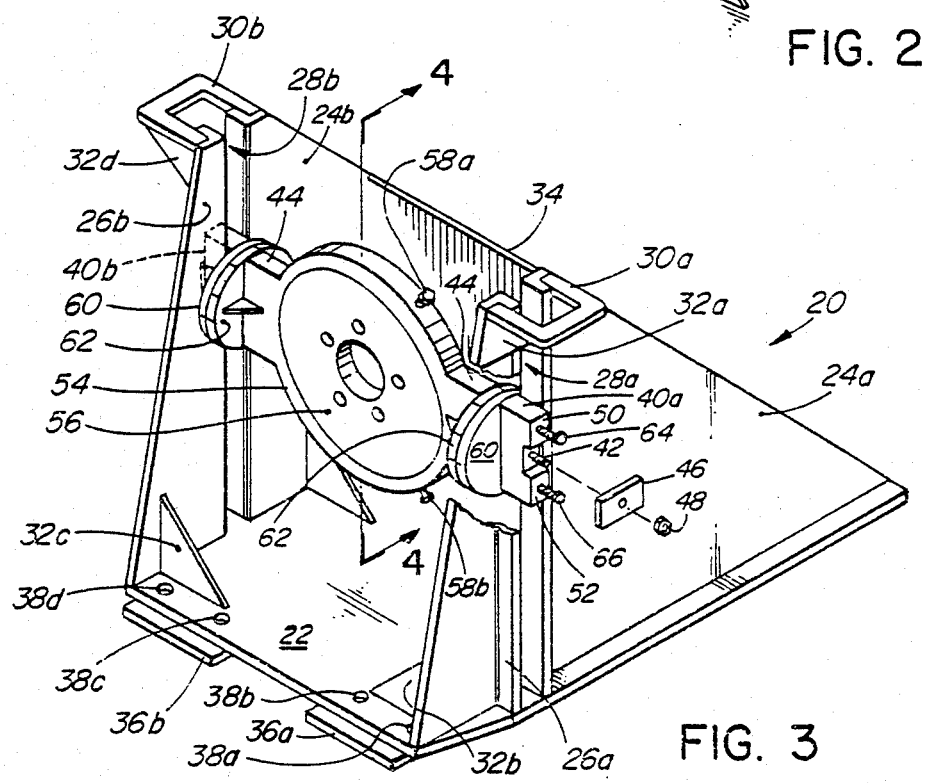
FIG. 3 is a perspective view, partially in section and partially exploded, of a preferred embodiment of an adjustable jig assembly according to the present invention.
Figure 4:
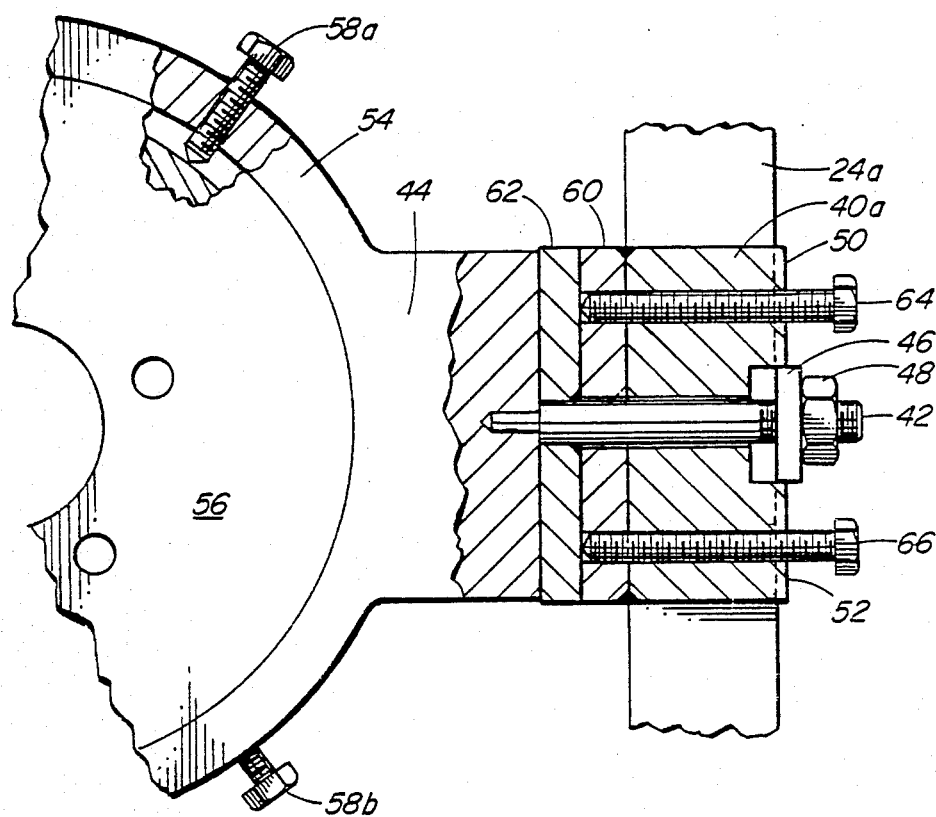
FIG. 4 is a front elevation view, partially in section, of substantially that portion of the adjustable jig assembly of FIG. 3 denoted by the lines 4—4.

In the particular embodiment illustrated in FIGS. 3 and 4, the slide block 40a is provided with an integral disc portion 60 adapted to overlie the front surfaces of the side wall members 24a and 26a adjacent the slide channel 28a. Additionally, the retaining means 44 is also provided with an integral disc portion 62 adapted to overlie the disc portion 60 of slide block 40a. The slide block 40a and disc portion 60 are further provided with threaded bores to receive set bolts 64 and 66 adapted to be tightened to bear against the retaining means disc portion 62 to assist in fixing the retaining means in desired angular orientation relative to slide block 40a.

Figure 5:
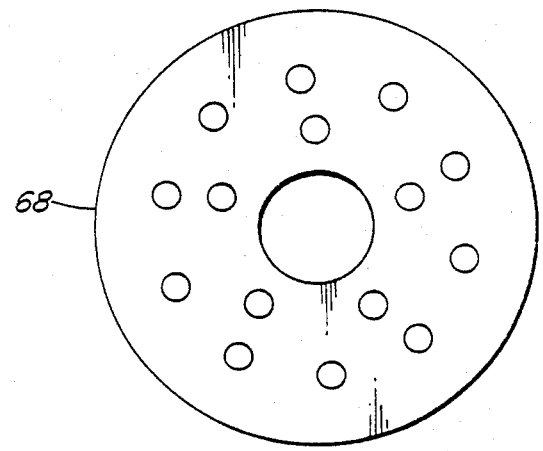
FIG. 5 is a front elevation view of an exemplary additional embodiment of a work piece engaging member for use in the adjustable jig assembly illustrated in FIGS. 3 and 4.

FIG. 5 illustrates an exemplary flange disc 68 which represents an alternate embodiment, in terms of bolt hole patterns and central opening, to the work piece engaging member 56 of FIGS. 3 and 4. Flange disc 68 is of a type particularly useful during the stress relieving of a replacement flanged pipe since the central opening need only be large enough to permit air passage, as a result of which there is sufficient face space available on the flange disc to accomodate bolt hole patterns for two or more different types of flanges, depending on the bolt patterns and the size of the central opening.

Figure 6:
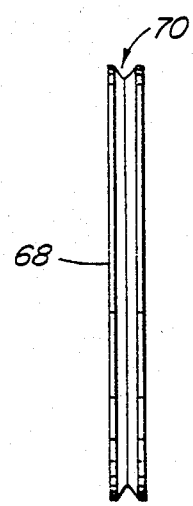
FIG. 6 is a side elevation view of the work piece engaging member illustrated in FIG. 5.

FIG. 6 illustrates that flange disc 68 is provided with a vee-groove about its circumference to facilitate positive engagement by appropriately tapered ends on the set bolts 58a and 58c of the retaining means 44.

All components of the assembly are normally fabricated of steel, principally mild steel.

Figure 2:
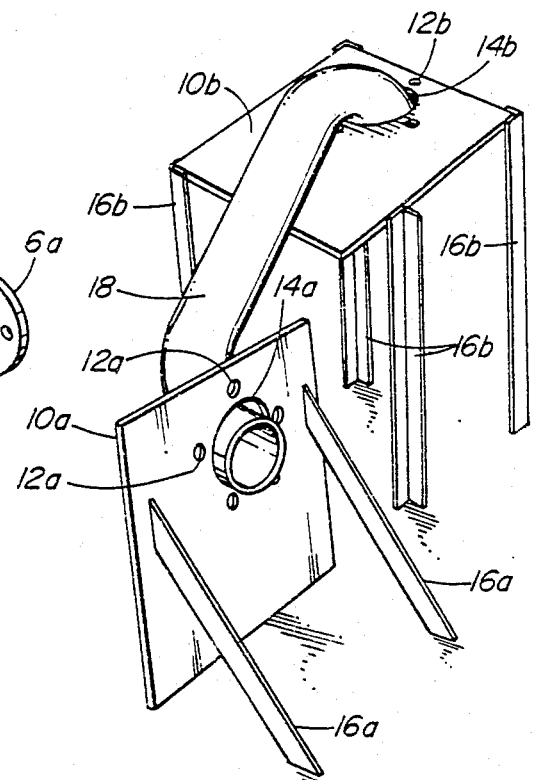
FIG. 2 is a perspective view of the present practice employing individual custom made jigs during a step in the manufacture of a replacement flanged pipe having the configuration illustrated in FIG. 1.

A pair of adjustable jig assembly units according to the invention can conveniently be employed in the manufacture of a replacement flanged pipe, again identical to the original pipe 2 illustrated in FIG. 1, in place of the custom made jigs illustrated in FIG. 2. Initially, an appropriate work piece engaging member 56, i.e. a flange disc having the appropriate bolt pattern and central opening for flange 6a, is loosely installed in the retaining means collar section 54 of a first adjustable jig assembly. The flange disc is rotated in the retaining means collar section 54 as necessary to align with the bolt hole pattern of the flange 6a of the original flanged pipe 2 and the set bolts 58a and 58b, etc., tightened. The flange 6a of the original flanged pipe 2 is then bolted to the flange disc. With the axle nuts 48 and set bolts 64 and 66 loosened, the retaining means 44 is moved into a desired vertical and axial orientation and fixed in place by tightening of the axle nuts 42 and set bolts 64 and 66. The procedure is then essentially repeated relative to flange 6b with a second adjustable jig assembly.

When the original flanged pipe 2 is securely mounted between the pair of adjustable jig assembly units the tack pads 36a and 36b, etc., of both the adjustable jig assembly units are tack welded to the working surface. The original flanged pipe 2 is then unbolted from the adjustable jig assembly units and appropriate new flanges bolted to the respective flange discs, whereupon fabrication proceeds as described previously with reference to FIG. 2, with the exception that it is not necessary to identifiably code the adjustable jig assembly units since the replacement flanged pipe, for the stress relieving operation, is simply mounted between another pair of the adjustable jig assembly units at the stress relieving work site by repeating the procedure previously employed to mount the original flanged pipe 2 between the pair of adjustable jig assembly units.

Numerous variations and modifications falling within the true broad spirit and scope of the invention will be readily obvious to persons skilled in the art, and the present specification is accordingly not to be construed limitatively.

The embodiments of the invention in which an exclusive property or privilege is claimed are defined as follows:

1. An adjustable jig assembly for holding a workpiece in a desired position, comprising
    a stand having wall members defining a pair of opposed substantially vertically extending slide channels;
    mounting means slidable in said slide channels and adapted to be secured at desired positions therealong;
    a housing for retaining a work piece engaging member, said housing extending between and mounted on said mounting means for rotation about a first axis and being adapted to be secured to said mounting means in desired angular positions about said axis, said housing including a collar section having threaded bores therein; and
    a disc-shaped work piece engaging member adapted to be attached to a work piece, said member being mounted in said collar section for rotation about a second axis normal to said first axis, and threaded members engageable with said threaded bores and the circumference of said member for securing said work piece engaging member in desired angular positions about said second axis.

2. An adjustable jig assembly according to claim 1, wherein said housing includes aligned stub axles on opposite ends thereof to extend through axially aligned journals provided in the mounting means.

3. An adjustable jig assembly according to claim 2, wherein the mounting means further includes plate members bored to fit over the stub axles of the retaining means and adapted to overlie the rear edges of the wall members adjacent the slide channels, and nut members adapted to mate with terminal threads provided on the stub axles of the retaining means and bear against the plate members to fix the retaining housing in desired positions along said channels.

4. An adjustable jig assembly according to claim 1, wherein the mounting means are complementary mounting means having bored block members slidable in the slide channels and having correspondingly bored facing disc portions adapted to overlie the front edges of the wall members adjacent the slide channels.

5. An adjustable jig assembly according to claim 4, wherein said housing further includes a disc portion at each end thereof adapted to overlie the facing disc portion of the mounting means.

6. An adjustable jig assembly according to claim 5, wherein the bored block members and correspondingly bored facing disc portions of the mounting means are threaded to receive threaded members adapted to engage the retaining means disc portions to assist in fixing the retaining housing in desired angular orientation.

7. An adjustable jig assembly according to claim 6, wherein the stand is provided with replaceable feet adapted for attachment to a working base surface.

8. An adjustable jig assembly according to claim 1, wherein the circumference of the disc-shaped work engaging member has an indented vee-shaped cross-section, and the threaded members are provided with tapered leading ends which engage the vee.

9. An adjustable jig assembly for holding a workpiece in a desired position, comprising:
    a stand having wall members defining a pair of opposed substantially vertically extending slide channels;
    mounting means including a bored block member slidable in each said slide channel, each block member having a correspondingly bored facing disc portion adapted to overlie the front edges of the wall members adjacent its respective slide channel, a stub axle, said stub axles of said block members being axially alignable with one another to define a first axis extending between said channels, a plate member bored to fit over the outer end of said stub axle and adapted to overlie the rear edges of the wall members adjacent said respective slide channel, nut members adapted to mate with terminal threads on said outer end of said stub axle and bear against the plate member to fix the block member in desired positions along said channel, and threaded members threadedly engaged with threaded through bores paralleling said first axis in said block member;
    a housing for retaining a work piece engaging member, said housing having a disc portion at each end thereof to overlie the facing disc portion of one of said block members, a journal at each end thereof for reception of a stub axle and rotation about said first axis, said threaded members of said block members being engageable with said housing disc portions so as to secure said housing in desired angular positions about said first axis, said housing including a collar section having a circular opening defining a second axis normal to said first axis, said collar having radial threaded bores therein opening into said opening; and
    a disc-shaped work piece engaging member adapted to be attached to a work piece, said member being mounted in said opening of said collar section for rotation therein about said second axis, and further threaded members engageable with said collar threaded bores and the circumference of said member for securing said work piece engaging member in desired angular positions about said second axis.

10. An adjustable jig assembly according to claim 9, wherein the work piece engaging member is retained in the collar section by connector means associated with the collar section which engage the disc-shaped work piece engaging member to fix the disc in desired angular orientation.

11. An adjustable jig assembly according to claim 10, wherein the stand is provided with replaceable feet adapted for attachment to a working base surface.

* * * * *

UNITED STATES PATENT AND TRADEMARK OFFICE
CERTIFICATE OF CORRECTION

PATENT NO. : 4,522,380
DATED : June 11, 1985
INVENTOR(S) : Darren C. Peddle

It is certified that error appears in the above-identified patent and that said Letters Patent is hereby corrected as shown below:

Col. 6, line 23, after "work" insert --piece--

Signed and Sealed this

Third Day of September 1985

[SEAL]

Attest:

DONALD J. QUIGG

Attesting Officer     Acting Commissioner of Patents and Trademarks - Designate